March 14, 1967

J. J. DICKSON 3,309,278

NUCLEAR REACTOR CONTROL MEANS

Original Filed Jan. 5, 1961

Inventor
James J. Dickson
By Forest C. Sexton
Attorney

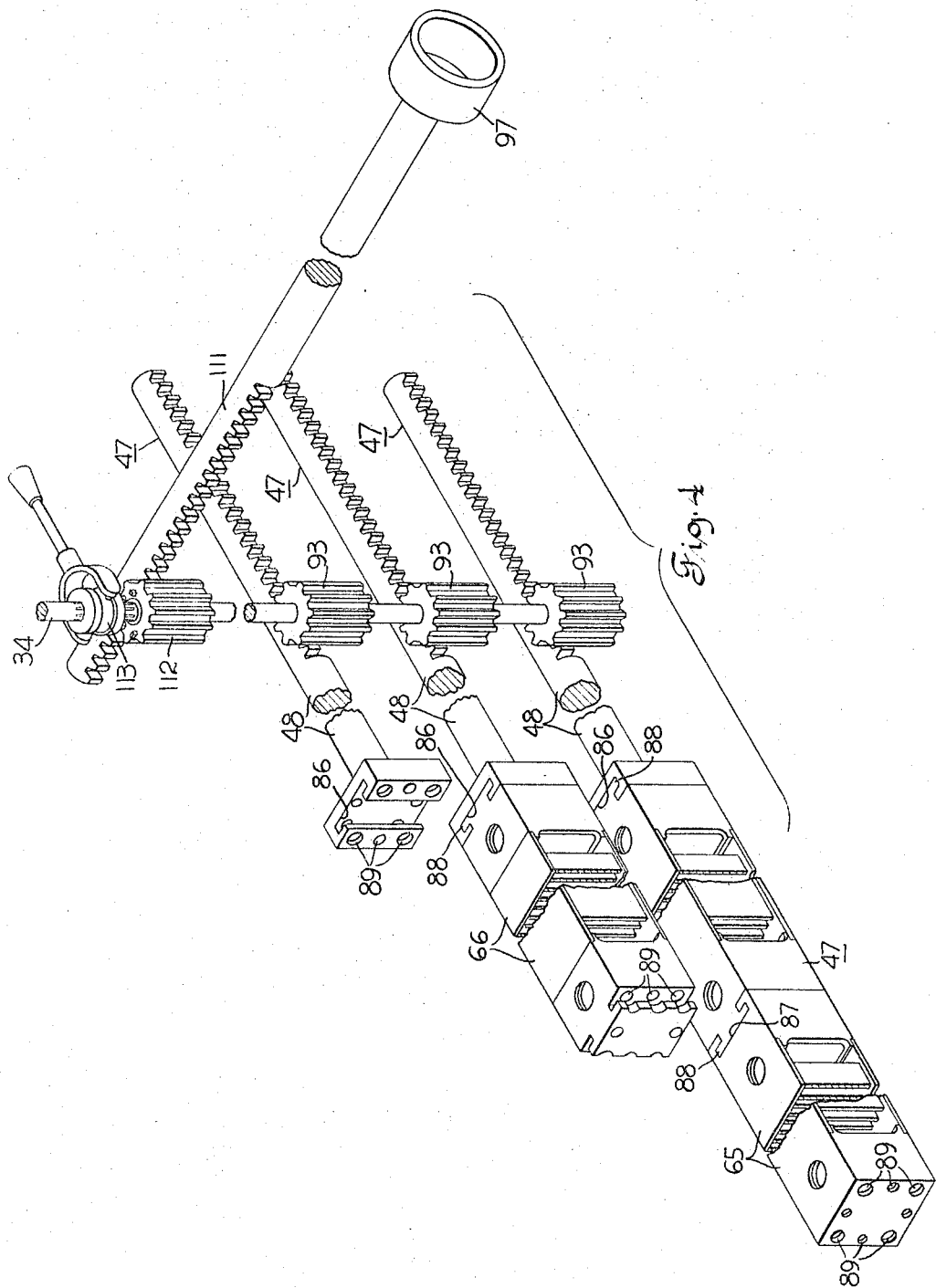

March 14, 1967 J. J. DICKSON 3,309,278
NUCLEAR REACTOR CONTROL MEANS
Original Filed Jan. 5, 1961 5 Sheets-Sheet 5

Inventor
James J. Dickson
By Forest C. Sexton
Attorney

United States Patent Office 3,309,278
Patented Mar. 14, 1967

3,309,278
NUCLEAR REACTOR CONTROL MEANS
James J. Dickson, Silver Spring, Md., assignor to Allis-Chalmers Manufacturing Company, Milwaukee, Wis.
Original application Jan. 5, 1961, Ser. No. 80,774, now Patent No. 3,208,914, dated Sept. 28, 1965. Divided and this application Nov. 24, 1964, Ser. No. 419,625
1 Claim. (Cl. 176—36)

This is a division of application Ser. No. 80,774, filed Jan. 5, 1961, now Patent No. 3,208,914.

This invention relates to nuclear reactors, and more particularly to power reactors which are adapted for use in mobile units as a source of propelling power.

Various types of neutronic reactors including pressurized water as well as boiling water and gas cooled (graphite moderated) types have heretofore been proposed for use in self-propelled units. However, the provision of an atomic power plant for mobile units which is satisfactory not only in its technical but also in its various practical aspects presents problems, diffculties and requirements which are peculiar to the environmental and operational conditions of the unit and which are not ordinarily encountered in land based stationary or fixed site installations.

For instance, in the conventional fixed site installation of water cooled and moderated reactors the reactor vessel and core are normally set up in a vertical position, the control rods are moved axially of the core, shielding is placed not only around the reactor vessel but also above and below it, and the actuating mechanism for the control rods is located generally at one end of the reactor vessel. Such an arrangement of the reactor complex in a stationary installation presents no particular problems in terms of operability, installed or total cost of the reactor complex, or in accessibility of reactor components for inspection, repair, outrage and overhaul. However, in mobile units and in submarines in particular, the conventional vertical arrangement of the reactor entails considerable difficulties due to prevailing environmental and operational conditions. Specifically, in a submarine, the use of reactors with high head room determines the diameter of the pressure hull and hence the silhouette which in turn governs its relative detectability as submerged. The load concentration of the conventional high head reactor, with its heavy shielding also does not allow distribution of loads in the hull to avoid areas of high stress concentration. The metacenter of the vessel cannot be kept as high as would be desirable because of the relatively high location of the center of gravity of the vertically positioned reactor complex.

A further disadvantage of the conventional vertical reactor arrangement in a submarine is the requirement of fuel withdrawal through a considerable distance from the core to the transfer or shipping cask employed as a protective container. This installing or removal distance gives manipulative difficulties in groping for and attachment of fuel elements.

Another difficulty which is characteristic of the use of vertical reactors in self-propelled units, and particularly in submarines, arises from the change of inclination from the vertical to which the reactor becomes subjected in such use and which, in a submarine, may involve very steep angles fore and aft in dive and surfacing operations. Roll and pitch of the vessel in heavy seas while floating, diving or surfacing must also be anticipated. These conditions affect the gravitational forces on the moving and movable parts of the reactor system as well as the water and steam separation. They may also cause shifting of the water level in the reactor vessel and thereby create a danger of momentary excessive radiation.

Generally, it is an object of the invention to provide an improved nuclear reactor which lends itself to use as a power source for mobile units and which will take care of the mentioned and other difficulties and requirements of such use in a practical and entirely satisfactory manner.

A further object of the invention is to provide an improved nuclear reactor of the above outlined character wherein control rods are movable axially of the vessel to different positions of adjustment including a scram position, various regulating positions, and a core unloading position wherein the control portions of the rods are entirely withdrawn from the active core region to facilitate installation of the fuel elements within and their removal from the reactor vessel through the mentioned top opening.

A further object of the invention is to provide an improved mechanism for actuating the control rods of a nuclear reactor of the above mentioned character, the mechanism being operable by one power source, such as an electric motor, to adjust a control rod or rods to various regulating positions, and by another power source such as a pneumatic cylinder, to actuate the control rods to scram positions. Adjustment of the control rods to the mentioned core unloading positions is preferably effected by means of the same power source which adjusts the control rods to their regulating positions.

These and other objects and advantages are attained by the present invention, various novel features of which will be apparent from the description herein and the accompanying drawings disclosing an embodiment of the invention, and will be more particularly pointed out in the appended claim.

Referring to the drawings:

FIG. 4 is an enlarged isometric schematic view of part of the reactor control mechanism.

Figure 1:
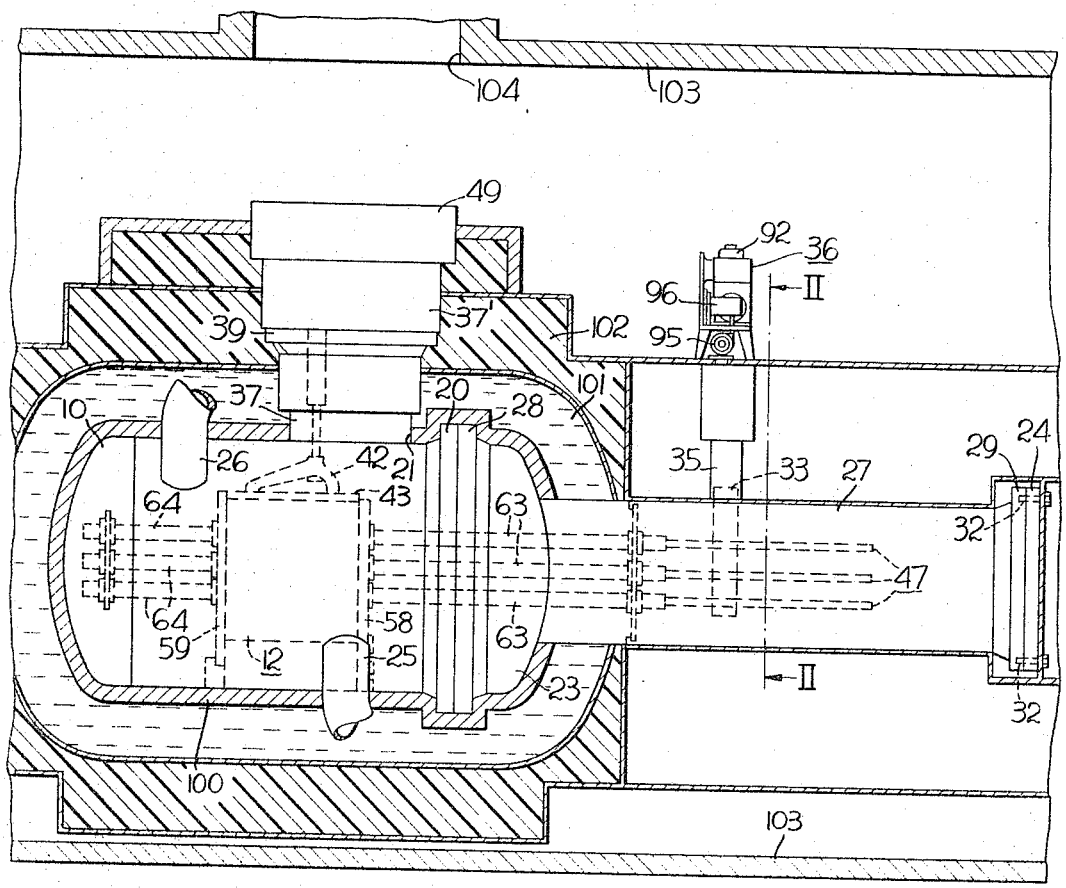
FIG. 1 is an elevational side view of a mobile nuclear reactor and environmental structure, part of the reactor and environmental structure being broken away and shown in section.

Referring to FIG. 1, a reactor pressure vessel 10 is a horizontally disposed vessel which is closed at one end and open at the other and which has an autwardly extending flange 20 around its open end. The reactor has an access opening 21 which serves as a refueling port in an upper longitudinally extending side wall of the vessel 10, a refueling port cover 22, an end head 23, an end head cover 24 and coolant inlet and outlet ports 25, 26.

The end head 23 comprises a longitudinally extending tubular housing 27 having outwardly extending flanges 28, 29 at its ends, respectively, and forms a coaxial extension to vessel 10. Housing flange 28 abuts the vessel flange 20 and is attached thereto by means such as bolts 30. A cover 24 is attached to the other housing flange 29 by means such as bolts 32.

To provide adequate sealing, suitable gaskets (not shown) are disposed between flange 29 and cover 24 and flanges 20, 28, and light seal welds are made around the outer periphery of the joint between the flanges 20, 28 and the flange 29 and cover 24.

The end head 23 has three bores 33 defined therethrough transverse to the axis thereof for passage of three control rod drive shafts 34, only one of these bores and shafts being shown. Upward extending adapters 35 are disposed concentrically within the bores 33 and provide means for connecting the control rod drives 36.

Nuclear core 12 is centrally disposed in vessel 10 and comprises a shroud structure 55 having a compact stacked arrangement of core elements therein, the core elements include sixty fuel element assemblies 51, 51', six dummy fuel assemblies 52, nine control rod assemblies 47 and nine guide sleeves 53.

Shroud 55, having side and bottom portions 56, 57, is supported at each end by front and rear end plates 58, 59 (FIG. 3) that rest on front and rear rings 60, 61 (FIG. 3) attached to the shell of vessel 10 as by welding. The rear end plate 59 is fixed to rear ring 61 and the front end plate 58 (FIG. 3) is slidably mounted on front ring 60 to accommodate thermal expansion. The end plates 58, 59 have flow openings 62 defined therethrough and guide tube extensions 63, 64 extending therefrom to receive the reciprocable sections 65, 66 of each control rod assembly 47. Shroud 55 is open at the top to allow the core elements to be removed and replaced through the refueling port 21. A handling device such as grappling tool 90 shown in FIG. 3 and described hereinafter is provided to remove and replace the individual core elements.

The control rod guide sleeves 53 are removable in the same way as the fuel assemblies 51, 51' and have substantially the same circumferential dimensions as the fuel assemblies 51, 51', but are slightly longer than the latter.

Figure 5:
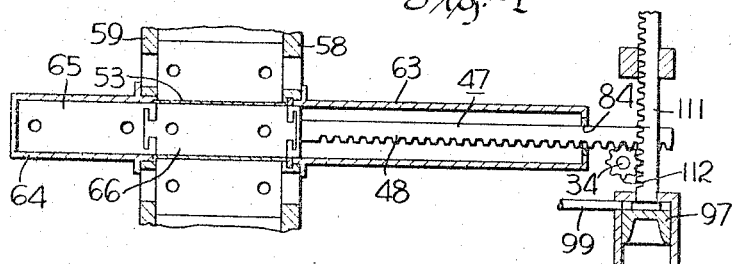
FIGS. 5, 6 and 7 are diagrammatic views illustrating various conditions of adjustment of the control mechanism shown in FIG. 7.
Figure 6:
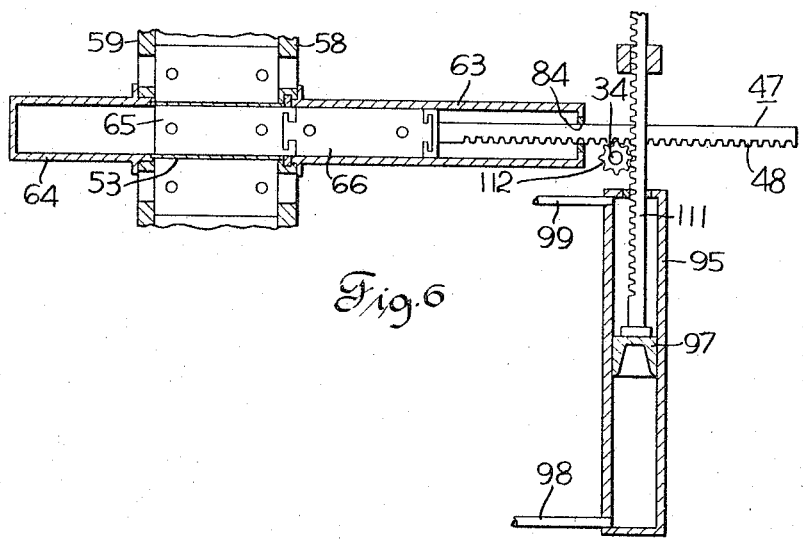
Figure 7:
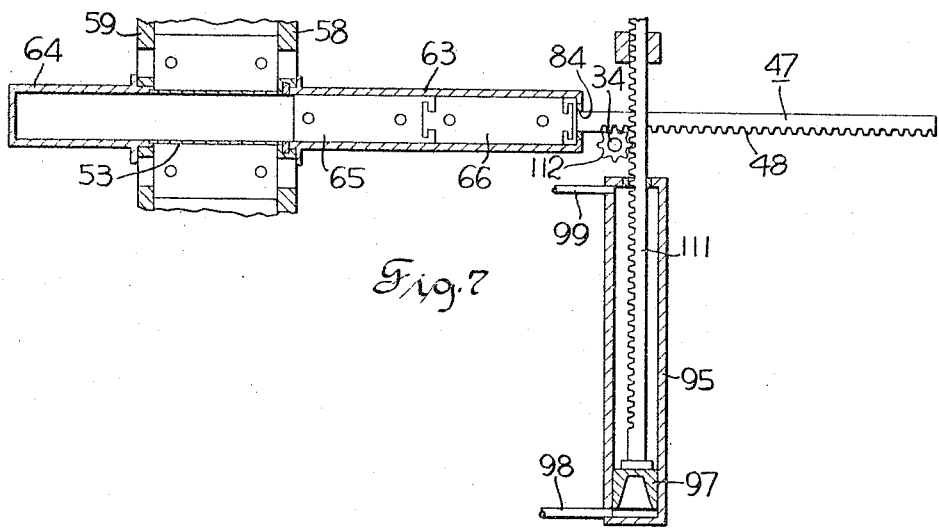

The core is controlled in conventional fashion by nine control rod assemblies 47 in a three times three array around the core center line. The reactor power is adjusted by endwise movement of the rods 47 between a scram position (FIG. 5) and an operating position (FIG. 6). The depletion of the burnable boron, if utilized, also adjusts the amount of available fission material. The control rods 47 are of square cross sectional configuration and are dimensioned to fit the space within the guide tube 53. Each rod assembly 47 comprises three detachably interconnected sections; namely, a fuel section 65, a poison section 66 and a rack section 48.

As shown in FIG. 4, the control rod assemblies 47 are sequentially assembled in an end to end relationship by coupling means utilizing a dovetail arrangement at the ends of the sections. The rack section 48 is provided with a T-slot 86; the fuel section 65 is provided with a T-slot 87 at one end thereof; and the poison section 66 is provided with T-heads 88 at its opposite ends. To assemble the control rod assembly 47, only the poison section 66 can be coupled to the rack section 48, and the fuel section 65 can only be coupled to the poison section 66. This arrangement prevents accidental coupling of the fuel section 65 directly to the rack section which would dispose a fuel section 65 in the core geometry during a "scram."

Figure 2:
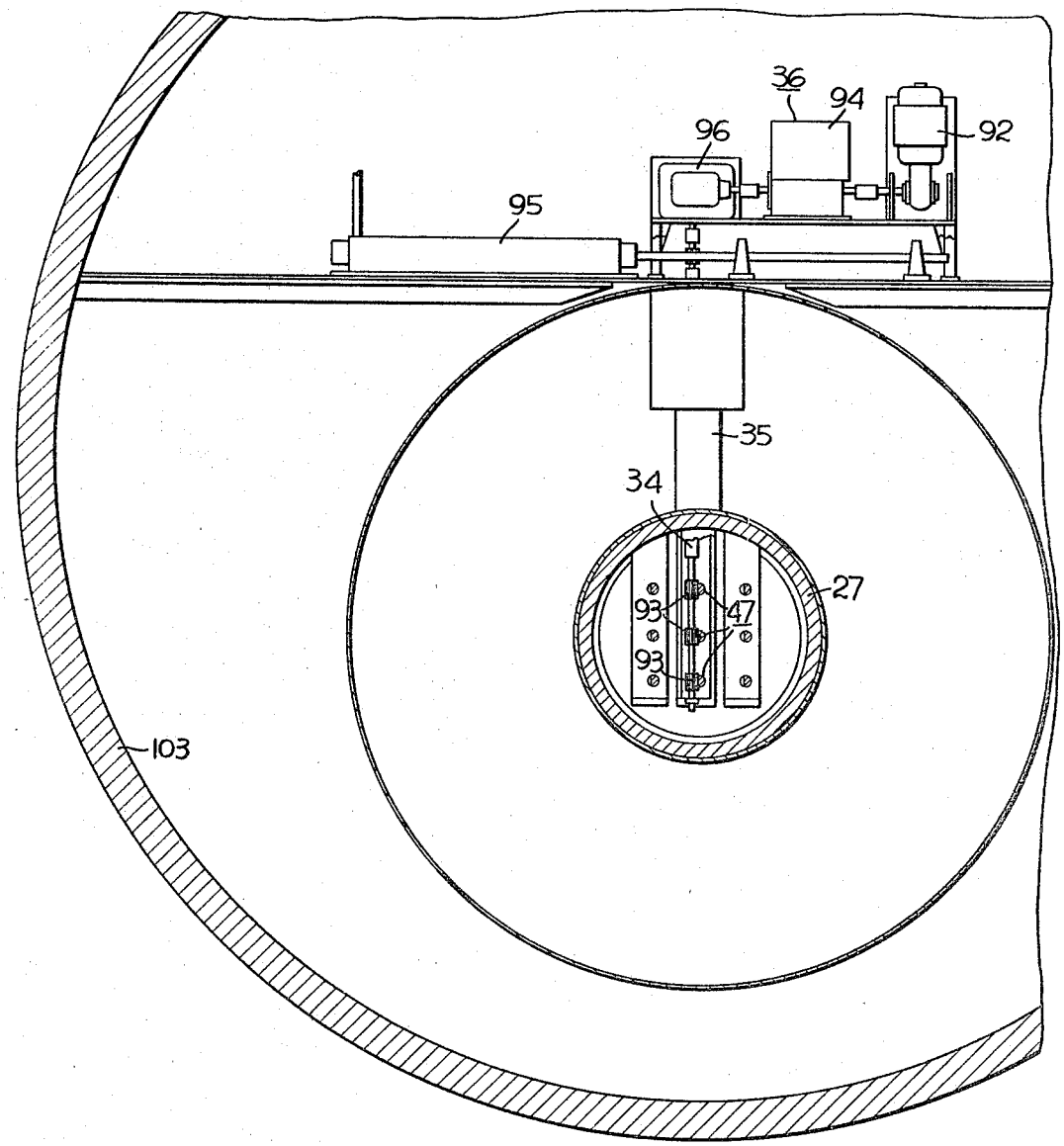
FIG. 2 is an enlarged section taken along line II—II of FIG. 1, part of the environmental structure being broken away.
Figure 3:
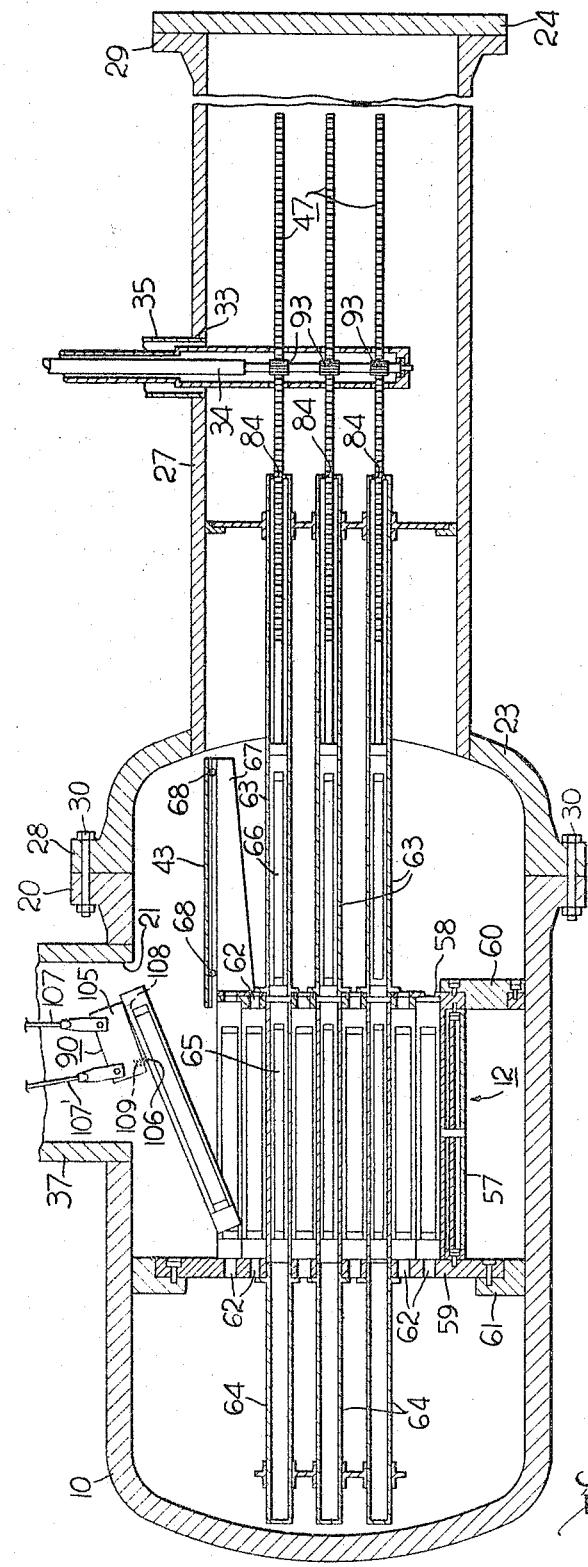
FIG. 3 is an enlarged and more detailed section of the reactor shown in FIG. 1.

As shown in FIGS. 1, 2 and 3, control rod drive mechanism 36 is removably mounted above vessel 10 and is supported on the tubular housing 27 by adapter 35. Shaft 34 (FIGS. 3 and 4) depending downward from each drive mechanism 36 through the adapter 35 is provided with three pinion gears 93 to engage each rack 48. The drive mechanism 36 includes an electric gear motor 92, magnetic clutch 94, gear box 96, rod position indicator (not shown), limit switches (not shown), and a pneumatic cylinder 95 for fast scrams. The magnetic clutch 94 transmits torque from the drive motor 92 to the gear box 96 when energized and is disposed between the drive motor 92 and gear box 96. The pneumatic scram cylinder 95 is disposed on a level below gear box 96 and is operatively coupled to drive shaft 34 during a scram. The scram mechanism is fail safe; that is, a loss in power deenergizes the magnetic clutch 94 to disconnect the electric motor 92 from the gear box 96 and permits the pneumatic cylinder 95 to drive the fuel section 65 of the control rod assembly 47 out of the core lattice and simultaneously substitute the poison section 66.

During normal reactor operation both ends of the pneumatic scram cylinder 95 are vented through a three-way, spring loaded solenoid valve (not shown) so that the cylinder plunger 97 freely follows the pinion shaft 34.

The plunger 97 is provided with a racklike extension 111 (FIG. 4). A scram pinion 112 is slip mounted on drive shaft 34 and is in engagement with rack 111. A jaw clutch 113 is associated with scram pinion 112 to alternatively engage pinion 112 to and disengage pinion 112 from shaft 34. During reactor operation, jaw clutch 113 is actuated to maintain pinion 112 in engagement with shaft 34. Thus, in the event of a scram, the movement of the plunger extension 111 is transmitted to the pinion gear and hence causes the shaft 34 to move the poison sections of the control rod assemblies 47 into the core 12.

Upon a scram signal, the magnetic clutch 94 and the solenoid valve (not shown) are deenergized. The valve is automatically positioned to direct compressed air into the cylinder 95 through pipe 98 and drive the plunger 97 to the scram position (FIG. 5). A dashpot (not shown) may be provided in the cylinder 95 to absorb the impact of the plunger 97 at scram velocity. It is equally possible to use spring loaded solenoid valves to control the flow of air through pipes 98 and 99, respectively, into and out of the scram cylinder 95.

Three control rod drive mechanisms 36 are provided and are arranged so that each mechanism 36 drives a gang of three control rod assemblies 47. Each of the three pinion gears 93 (FIG. 4) utilized to drive the three racks 48 includes a two-way slip clutch (not shown) to permit any rod 47 in a gang of three to be operated if one or two become inoperable. If desired, the drive mechanism 36 may be adapted to operate with standby battery power in event the main power source is interrupted.

To provide adequate circulation of coolant through the core, the fuel assemblies 51, 51' are open at the ends thereof, the guide sleeve extensions 63, 64 are provided with apertures 84 (FIG. 3) at the ends thereof, and each control assembly 47 (FIG. 4) has apertures 89 defined in the ends of each section therein.

It is understood that this invention is not to be limited to the details given herein, but that it may be modified within the scope of the appended claim.

What is claimed is:

In a nuclear reactor of the type having a core including fuel element assemblies and a plurality of control rods reciprocable endwise relative to said fuel element assemblies, a mechanism for simultaneously moving a plurality of said control rods to predetermined positions to endwise adjustment, said mechanism comprising a plurality of gear racks fixedly connected in lengthwise extending relation with said control rods, respectively; a cross shaft rotatably mounted to extend transversely of said gear racks and having a plurality of axially spaced drive pinions secured thereto in meshing engagement, respectively, with said racks; an auxiliary drive pinion mounted on said shaft in torque transmitting relation thereto; an auxiliary reciprocable gear rack in mesh with said auxiliary drive pinion, torque transmitting means connected with said shaft and operable to selectively rotate the latter in opposite directions; and thrust transmitting means operatively connected with said auxiliary gear rack for moving the latter endwise from one predetermined position to another.

References Cited by the Examiner

UNITED STATES PATENTS

| | | | |
|---|---|---|---|
| 2,816,860 | 12/1957 | Wilson et al. | 176—36 |
| 2,938,847 | 5/1960 | Yeomans | 176—36 |
| 3,245,879 | 4/1966 | Purdy et al. | 176—36 |

CARL D. QUARFORTH, *Primary Examiner.*

L. DEWAYNE RUTLEDGE, *Examiner.*

H. E. BEHREND, *Assistant Examiner.*